Sept. 18, 1945.         S. KAHN              2,384,928
               CASE FOR DIAL INSTRUMENTS
             Filed March 10, 1943      3 Sheets-Sheet 1

Fig.1ª

Inventor
Samuel Kahn
by Roberts Cushman Woodbury
Attys.

Sept. 18, 1945.　　　　　S. KAHN　　　　　2,384,928
CASE FOR DIAL INSTRUMENTS
Filed March 10, 1943　　　3 Sheets-Sheet 2
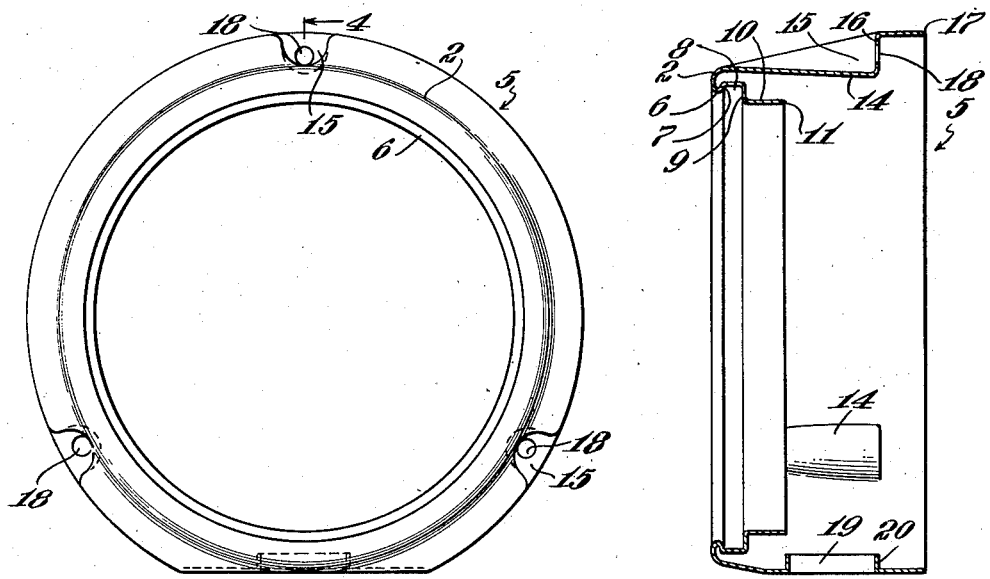
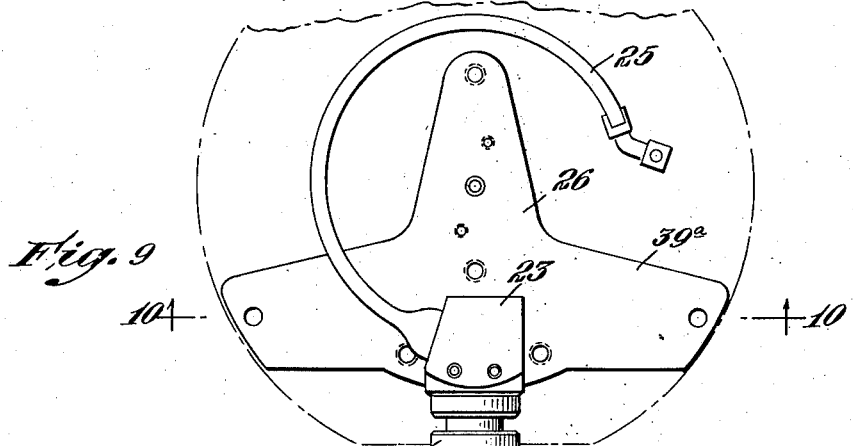
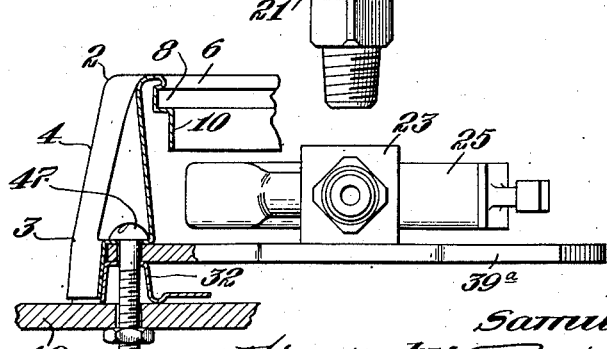
Inventor
Samuel Kahn
by Roberts Cushman & Woodberry
Att'ys.

Sept. 18, 1945.  S. KAHN  2,384,928
CASE FOR DIAL INSTRUMENTS
Filed March 10, 1943   3 Sheets-Sheet 3

Inventor
Samuel Kahn
by Roberts Cushman Woodbury
att'ys.

Patented Sept. 18, 1945

2,384,928

UNITED STATES PATENT OFFICE 2,384,928

CASE FOR DIAL INSTRUMENTS

Samuel Kahn, Bridgeport, Conn., assignor to Manning, Maxwell & Moore, Incorporated, New York, N. Y., a corporation of New Jersey Application March 10, 1943, Serial No. 478,635

19 Claims. (Cl. 73—431)

This invention relates to pressure gauges, dial thermometers or other instruments of generally similar construction wherein a pointer or index is moved over a graduated dial by mechanism housed within a protective casing, the latter having a transparent front panel, and relates more especially to a novel case for such instruments.

Patent No. 2,271,423, granted to Graesser and Hopkins, January 27, 1942, discloses an instrument case so designed that it may readily be made, for example, from one of the plastic non-metals, having adequate strength to withstand distortion by reason of the stresses imposed during use and which also possesses a pleasing external appearance.

Since the introduction of the instrument case disclosed in said patent, it has been adopted by most instrument makers and the old cast metal case which it superseded has almost disappeared from the market. While the case disclosed in said patent has many advantages over the old metal case, its walls must necessarily be of substantial thickness in order to insure the requisite strength, since such plastic materials are not nearly as strong as metal. Thus, although not as heavy as the old cast metal cases, the plastic case is heavier than desirable, particularly for use on naval vessels where the weight of every item of equipment is most carefully scrutinized. Moreover, the amount of the plastic material employed is considerable and by reason of its relatively high price it adds substantially to the cost of the instrument.

In the ordinary handling of an instrument of this kind, for example in shipping it to the user, the case is not normally subjected to excessive stresses and for a case of 4½ inches diameter, for example, sheet metal of a thickness of 0.020 inch would be ample to resist such stresses. However, when the instrument is mounted upon a supporting panel and when it is being connected to the pressure supply pipe it may be severely stressed and to withstand such stresses it would be necessary to use metal of the order of 0.0625 inch thick for the entire case if designed in accordance with usual procedures.

While it has heretofore been proposed to make instrument cases of sheet metal, apparently but little attempt has heretofore been made to use such metal economically, the designer merely resorting to the expedient of employing metal of such thickness as unquestionably to insure adequate strength, with the result that such prior sheet metal cases, like the plastic cases, were unduly heavy.

A principal object of the present invention is to provide an instrument case of the class described, preferably though not necessarily, of the general contour and external appearance of the case disclosed in the aforesaid Graesser and Hopkins patent, but which may be of substantially less weight than the plastic case disclosed in said patent, although possessing adequate strength. A further object is to provide an instrument case having sufficient strength to resist stresses to which it is subjected during general handling, panel installation, and the connection of the pressure pipe, but which is of less weight than prior metal or plastic cases of similar size, and which may be of drawn or sheet metal.

A further object is to provide an instrument case of metal wherein the material is so distributed and arranged as to provide the requisite strength in each of its constituent parts to withstand the peculiar stresses to which such part is subjected during shipment, installation or use of the instrument.

Other and further objects and advantages of the invention will be pointed out hereinafter in the following more detailed description and by reference to the accompanying drawings wherein Fig. 1 is a front elevation of an instrument, for example a pressure gauge, having a case embodying the present invention, the transparent front panel and dial being broken away and the movement mechanism being removed in order clearly to show the construction of the case itself;

Fig. 1ª is a small scale side elevation of the case of Fig. 1, shown mounted on a supporting panel;

Fig. 3 is a front elevation, to somewhat smaller scale, of the body portion of the case;

Fig. 4 is a section substantially on the line 4—4 of Fig. 3;

Fig. 9 is a front elevation illustrating a modified construction in which the mounting plate is integral with the socket pad; and Fig. 10 is a fragmentary section on line 10—10 of Fig. 9, showing portions of the instrument case and the mounting plate.

Figures 1, 2:
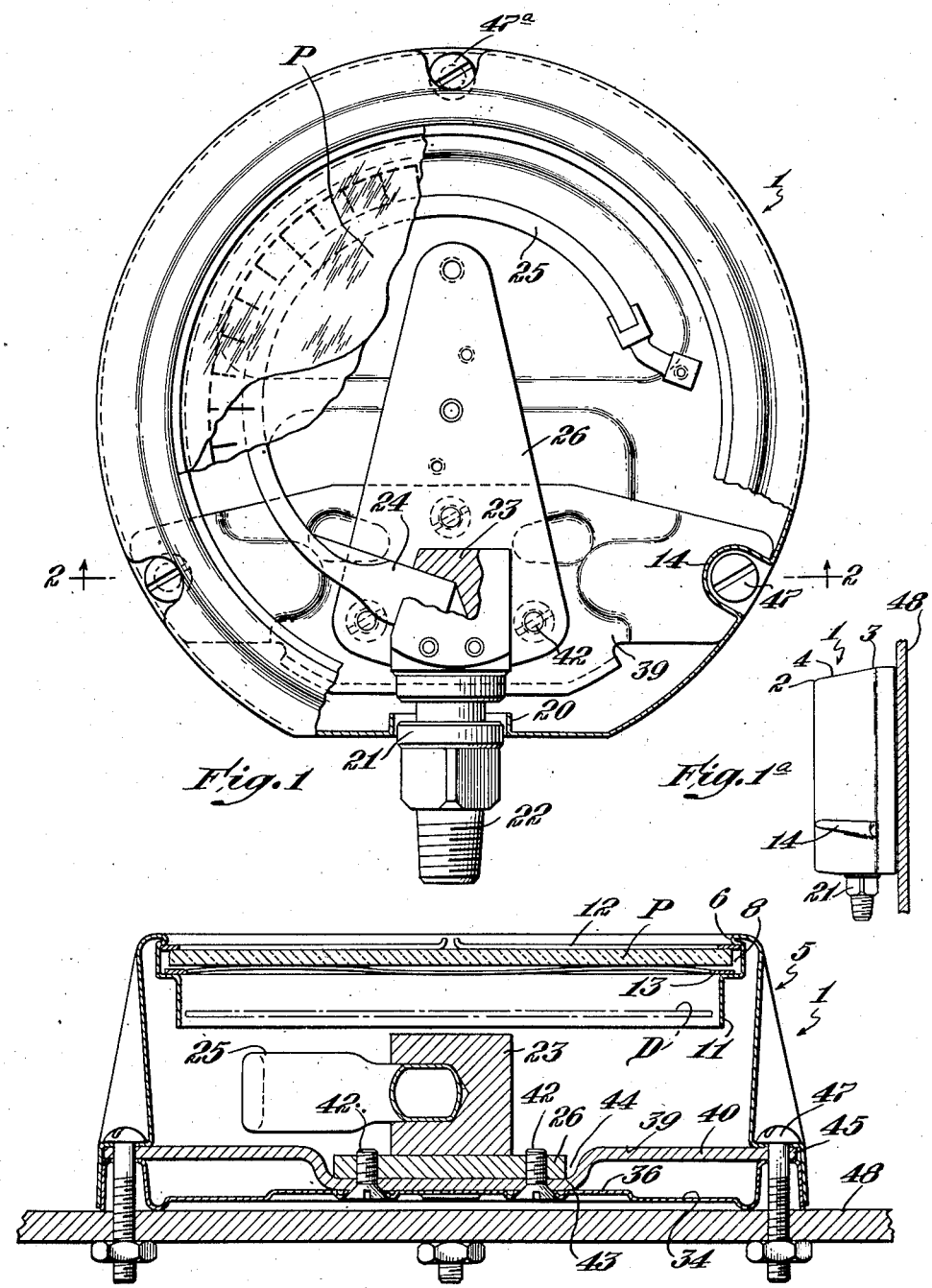
Fig. 2 is a section substantially on the line 2—2 of Fig. 1.

Referring to the drawings the numeral 1 designates the improved gauge case in accordance with the present invention. As here illustrated (Fig. 1a) this case is of substantially the same external contour as that disclosed in the above referred to patent to Graesser et al., although in its broader aspects the invention is capable of embodiment in cases of varied external contour. As here illustrated (Fig. 1a) the case increases in diameter from its forward edge 2 to a point 3 preferably spaced a short distance (for example a distance of the order of ⅕ the entire depth of the case) from the plane of the rear surface of the case, so that the external surface 4 of the forward main part of the case is substantially that of a truncated cone, the exterior surface 4 flaring rearwardly from the front edge 2 and being substantially smooth and devoid of any appreciable projections or other protuberances. The rear portion of the case, between the point 3 and the plane of the back surface of the case is substantially cylindrical, or may flare rearwardly very slightly, but the cylindrical and conical surfaces preferably merge in a smooth curve at the point 3.

The improved case comprises a unitary annular shell 5 or body portion (Figs. 3 and 4) which may consist of thin sheet metal or other appropriate material to which the desired shape may be imparted in accordance with customary methods, for example by drawing, pressing, spinning or the like. The forward edge 2 of the shell 5 (Figs. 3 and 4) is smoothly curved and merges with an inwardly directed finish bead 6 whose rear surface 7 (Fig. 4) constitutes an abutment shoulder defining the front wall of an internal, circumferential channel 8. The material forming the shell extends inwardly to form an annular apron so shaped as to constitute the side wall and the rear wall 9 of the channel 8, and which then extends rearwardly to form a cylindrical finishing wall 10 which terminates at 11, at a point slightly behind the plane of the dial D (Fig. 2). This wall forms a peripheral closure for the space immediately in front of the dial, thus imparting a finished effect. The channel 8 is designed to receive the edge of a transparent panel P (Fig. 2) of glass or the like which is retained in place by means of a snap ring 12 which engages the forward wall 7 of the channel, the panel preferably being urged forwardly toward the wall 7 by a spring ring 13 which bears against the rear wall 9 of the channel. Such panel retaining means is more fully described and claimed in the patent to Graesser et al. No. 2,294,175, dated August 25, 1942. While this form of retaining means for the transparent panel is preferred, it forms no necessary part of the present invention.

At equally spaced points about the periphery of the shell 5 the side wall of the latter is indented as indicated at 14, the indentations extending from adjacent to the front edge 2 rearwardly, and forming fastener-receiving niches 15. Each of these niches terminates in a rear wall or floor 16 substantially parallel to the plane of the rear edge 17 of the shell and preferably disposed substantially in the plane of the junction of the conical and cylindrical surfaces of the shell. The wall or floor 16 of each of the niches is furnished with an aperture 18 for the reception of a fastener element as hereinafter described.

As above suggested, this shell 5 may be of thin sheet metal, for example metal of the order of 0.020 inch thick, but by reason of the shaping of the material as above described, in particular the formation of the bead 6, the inwardly directed apron portion 10, and the indentations 14, this shell is greatly stiffened and made capable of withstanding the ordinary stresses of handling. As illustrated in Figs. 3 and 4, the shell may be flattened at its lower part, such flattened portion having an aperture 19 bounded by an inwardly directed annular flange 20. This aperture is designed to receive the stem portion 21 of a socket member (Fig. 1), here shown as having an externally screw-threaded nipple portion 22 designed to receive a pressure supply pipe. The socket member also includes the block 23 having formed therein a socket for the reception of the fixed end 24 of the Bourdon tube 25 which constitutes the pressure motor for actuating the instrument mechanism (not shown). The socket member also comprises the pad portion 26 by means of which the socket member is secured to the gauge case. As here shown, this pad 26 is extended upwardly to constitute the rear plate of the movement frame.

Figures 5, 6:
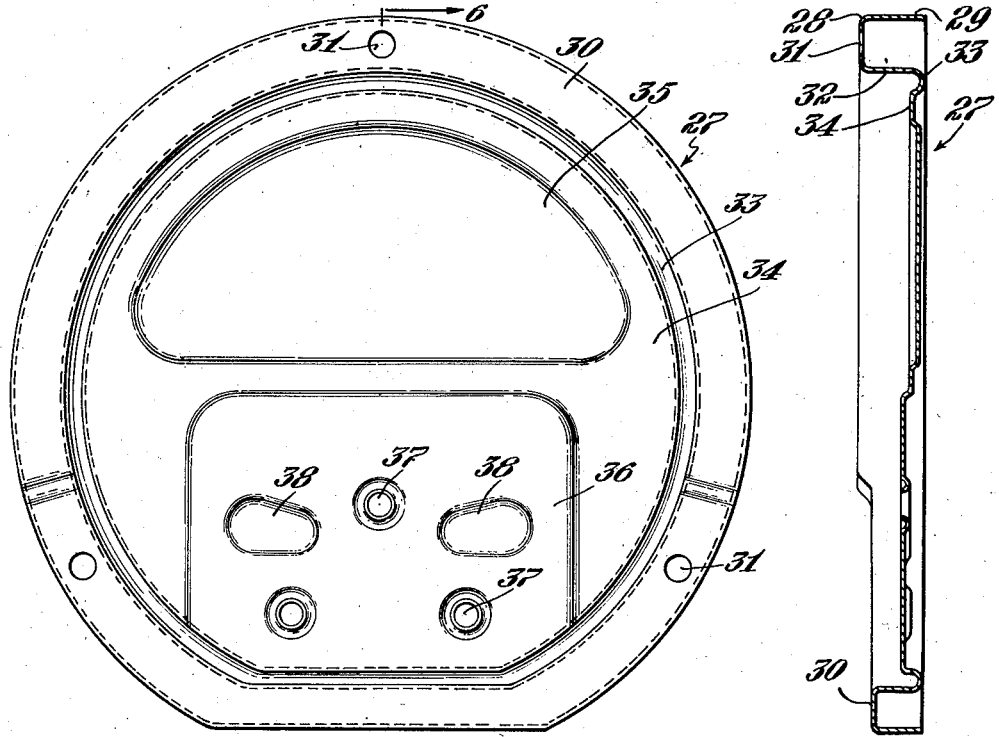
Fig. 5 is a front elevation, to larger scale, of the back member of the case.
Fig. 6 is a section on the line 6—6 of Fig. 5.

The case also comprises a back 27 (Figs. 5 and 6). This back 27 is also of thin material, for example sheet metal, and of the same thickness, if desired, as the metal used in making the annular shell or body portion 5 of the case. The material of the back is preferably struck forwardly at its marginal portion to provide the forwardly directed hollow marginal bead 28 having the outer wall 29 which may flare slightly if desired and which is designed to fit snugly within the rear cylindrical portion of the shell 5. The forward wall 30 of this hollow marginal bead is preferably substantially flat and parallel to the plane of the rear surface of the case and is provided at equally spaced intervals with openings 31 designed to register with the openings 18 in the parts 16 of the shell member. The inner wall 32 of the marginal bead 28 merges at its rear edge with a rearwardly directed bead 33 which, in turn, merges with the transverse web portion 34 of the back. This web portion is embossed rearwardly at 35 and forwardly at 36, the embossing at 36 being such as to provide a low, forwardly directed generally rectangular boss, the latter having openings 37 therein, preferably stiffened by marginal embossings. This boss 36 is also furnished with embossed areas 38 preferably concave forwardly. The shaping of this back member by embossing and in particular by the formation of the marginal bead 28, increases its stiffness so that even though of very thin metal it is capable of withstanding such stresses as are imposed upon it in handling.

Figure 8:
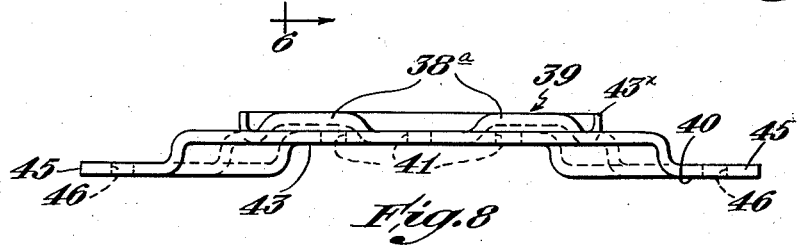
Fig. 8 is an edge elevation of the device shown in Fig. 7.
Figure 7:
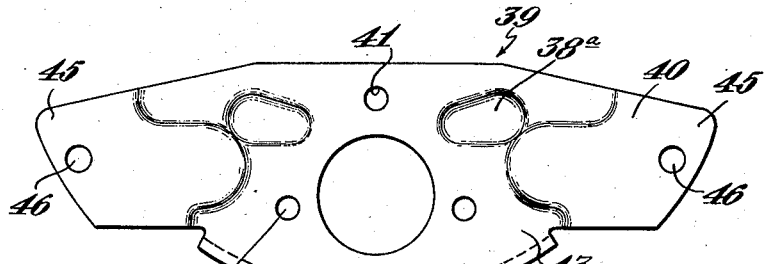
Fig. 7 is a front elevation of the bridge member or mounting plate of the instrument.

A bridge or mounting member 39 (Figs. 7 and 8) extends transversely across the case within the rear portion of the chamber defined by the shell 5 and the back 27. This bridge member is of much heavier and stiffer material than the shell and back, for example, it may be of sheet metal of the order of 0.0625 inch thick. The midportion of this bridge or mounting member is furnished with apertures 41 designed to receive fastening screws 42 (Fig. 2) which pass through the openings 37 in the back and through the bridge member and into threaded openings in the socket pad 26. The central portion 43 of this bridge member is preferably embossed so as to project rearwardly of the plane of its end portions and thereby to provide a concavity 44 (Fig. 2) for the reception of the pad 26, the front face of the pad thus lying substantially in the plane of the forward surface of the end portions of the bridge member. This central portion 43 of the bridge member is stiffened by a rearwardly directed marginal flange 43ˣ and is also preferably furnished with rearwardly directed bosses 38ᵃ which are designed to fit into the cavities 38 of the back 27, thus assisting in holding the parts in proper registration. The flat end portions 45 of the bridge member are furnished with apertures designed to register with the apertures 18 and 31 of the shell and back respectively, the end portions 45 of the bridge member being designed to be interposed between the rear surfaces of the floors 16 of the niches 15 of the shell and the forward surface 30 of the bead 28 of the back. When the parts are thus assembled (with the openings 18, 46 and 31 in registry) bolts 47, or other equivalent fastening means, are passed through the registering openings, the bolts thus acting to clamp together the several parts of the casing. These bolts 47 also constitute the means for securing the entire instrument to a panel or other supporting element 48 (Fig. 2). A third bolt 47ᵃ, at the top of the case, further assists in securing the instrument in place. If desired, after assembly of the shell and back with the mounting plate, the shell and back may be spot welded together if desired, or the back may have a press-fit in the shell.

Since the bridge member 39 is of heavy material and is so embossed as to impart further stiffness to it, and since the entire operative mechanism of the instrument, including the socket member, pad and Bourdon tube, is secured to and supported by this bridge member, and since the bridge member receives the bolts 47, by means of which the instrument is supported, the shell 5 and back member 27 are substantially relieved of all stresses other than those relatively small stresses which may be imposed during the handling of the instrument prior to its mounting upon the supporting panel and its connection to the supply pipe. Stresses imposed during mounting it upon the panel are resisted by the rigid and stiff bridge member 39 and likewise stresses imposed in attaching the supply pipe to the nipple 21 are resisted by this bridge member.

With the arrangement here described, it is possible to construct an instrument case which, while possessing all of the advantages of the case disclosed in the above patents to Graesser et al., is lighter in weight and may be made of cheaper material than the plastics now available. For example, it is possible to make the shell and back of thin sheet aluminum without danger of serious damage during the handling, mounting and use of the instrument.

In the arrangement illustrated in Figs. 9 and 10, the bridge member 39ᵃ is shown as constituting an integral extension of the pad 26. This pad 26 (and likewise that previously described) may initially be a separate piece of material, for example heavy sheet metal, but is rigidly and permanently secured to the block 23 in any desired manner, for example by spot welding, brazing, or the like. In other respects, the case disclosed in Figs. 9 and 10 may be identical with that above described, but by making the pad 26 and bridge member 39ᵃ integral, one less part is required to be made and handled in assembly than in the previously described construction.

While certain desirable embodiments of the invention have been disclosed by way of example, it is to be understood that the invention is not necessarily limited to these precise embodiments but is to be regarded as broadly inclusive of any and all modifications and equivalent constructions falling within the terms of the appended claims.

I claim:

1. An instrument case comprising a unitary body portion, a back and a movement-mounting plate, the body portion and back being of thin material and the mounting plate being of relatively thick material, means uniting the body portion, back and mounting plate, the body portion, back and mounting plate having registering apertures for the reception of fasteners by means of which the instrument may be mounted upon a supporting panel.

2. A flangeless gauge case having a truncated, conical, forwardly tapering and smooth external contour, said case comprising a unitary body portion of thin material, a back member of thin material and a movement-mounting plate of relatively thick material extending transversely across the body portion forwardly of the back member, and fasteners extending through elements of the body portion, back member and mounting plate for attaching the instrument to a support.

3. An instrument case comprising an annular shell of thin sheet metal having a transparent front closure panel, a removable back also of thin sheet metal normally closing the rear of the shell, a stiff and rigid mounting member constituting a support for the mechanism of the instrument, and fastener elements which concomitantly unite the shell and back to the mounting member and secure the latter to a support.

4. An instrument case comprising a unitary annular shell of thin sheet material closed at its front by a transparent panel, a removable back of thin sheet material normally closing the rear of the shell, the assembled shell and back providing a chamber for the reception of instrument mechanism, and a bridge member of relatively thick and stiff sheet material extending transversely across the rear part of said chamber, and means uniting the shell, back and bridge member, said bridge member being shaped to receive attaching elements by means of which the instrument may be mounted on a support, the central part of said bridge member being designed to support instrument mechanism.

5. An instrument case comprising a unitary body portion, a back and a movement-mounting plate, the body portion and back being of thin material and the mounting plate being of relatively thick material, means whereby the body portion, back and mounting plate are united, the body portion having circumferentially spaced indentations defining fastener-receiving niches, said niches having apertured bottom walls and the back and mounting plate having fastener-receiving apertures which register with the apertures in the bottom walls of the niches.

6. An instrument case comprising an annular shell and a back, the back having a peripheral wall which fits snugly within the rear portion of the shell, the shell and back each being made of thin material and when assembled defining a chamber for the reception of instrument mechanism, and a bridge member of relatively heavy material extending transversely across said chamber and constituting a support for instrument mechanism, means operative to hold the shell, back and bridge member in assembled relation, the end portions of said bridge member being shaped to receive fasteners by means of which the instrument may be secured to a support.

7. An instrument case comprising separable parts made of thin, light-weight material and which, when assembled, define a chamber for instrument mechanism, and a heavy bridge member of sheet material embossed to stiffen it and extending transversely of said chamber and constituting a support for instrument mechanism, and means operative to hold the casing parts and the bridge member in assembled relation, the bridge member being designed to receive fasteners at points adjacent to its opposite ends by means of which the instrument may be mounted on a support.

8. An instrument case designed to receive a pressure-actuated movement mechanism and to be connected to a pipe-attaching socket having a passage through which pressure fluid is supplied for actuating the movement mechanism, the casing having a heavy mounting member to which the pipe-attaching socket is united and upon which the movement mechanism is mounted, said mounting member being of embossed sheet metal and extending transversely across the case and having apertures at its opposite ends for the reception of fasteners by means of which the instrument may be secured to a support, the case also comprising an annular shell and a back, the shell and back being designed and arranged to receive the end portions of the mounting plate between them and having registering openings for the passage of said fasteners and means operative to hold the shell, back and mounting member in assembled relation.

9. A flangeless gauge case comprising a unitary body portion, a back member and a movement-mounting plate, the body portion having a truncated and smooth conical external contour, the rear end of the case being of greater diameter than the front and the back member fitting snugly within the rear part of the body portion, the wall of the body portion having therein rearwardly extending niches in its outer surface for the reception of attaching elements, said niches having apertured rear walls, the ends of the mounting plate being interposed between said rear walls and the back member and having apertures for the reception of attaching elements and means removably uniting the body portion, back member and mounting plate.

10. An instrument case comprising an annular shell of thin sheet metal and a back also of thin sheet metal, the shell and back when assembled defining a chamber for the reception of movement mechanism, the back fitting snugly within the rear portion of the shell and having a marginal stiffening bead, that portion of the back which is bounded by said bead being embossed to stiffen it and having openings for the reception of fasteners, the case also comprising a stiff transversely extending mounting member whose mid portion constitutes a support for the movement mechanism and having provision adjacent to its opposite ends, respectively, for the reception of fasteners by means of which the instrument may be attached to a support and fasteners uniting the back to the mounting member.

11. An instrument case comprising a stiff mounting plate, an annular shell of thin sheet metal having a transparent front closure and a back member also of sheet metal, the back member being shaped to fit snugly within the rear portion of the shell, the margin of the back member being shaped to provide a hollow stiffening bead, the material of the back which is bounded by said bead being embossed to stiffen it and including a forwardly projecting boss designed to contact the mounting plate, the boss having openings for the reception of fasteners for uniting the back to the mounting plate and fasteners passing through said openings and uniting the back and mounting plate.

12. An instrument case comprising a unitary body portion, a back and a mounting plate, the body portion and back being of thin material and the mounting plate being of relatively thick material, the body portion having circumferentially spaced indentations having apertured rear walls disposed forwardly of and in a plane substantially parallel to the plane of the rear edge of the body portion, the mounting plate engaging the rear sides of said apertured walls, the back engaging the rear surface of the mounting plate, the back and mounting plate having apertures which register with the openings in said apertured walls of the body portion, and fasteners extending through the registering apertures.

13. A flangeless gauge case having a truncated, conical, forwardly tapering and smooth external contour, said case comprising a unitary body portion provided at its front with an internal circumferential groove for the reception of the edge of a transparent panel, a removable back member which fits snugly within the rear part of the body portion, a movement mounting plate extending transversely of the body portion forwardly of the back member, the body and back of the case being of thin metal and the mounting plate being of relatively thicker metal, and means releasably uniting the body portion, back member and mounting plate.

14. An instrument case comprising a unitary body portion, a back and a movement-mounting plate, the body portion and back being of thin material and the mounting plate being of relatively thick material, the body portion having circumferentially spaced indentations defining fastener-receiving niches, each niche having a bottom wall spaced forwardly from the rear edge of the body portion, the mounting plate engaging the rear surfaces of said bottom walls, the back having a forwardly directed marginal bead which engages the rear surface of the mounting plate, and means operative to clamp the body portion, mounting plate and back member together.

15. An instrument case comprising a unitary body portion and a removable back, the body portion comprising an outer wall which smoothly merges at the front edge of the case with an inwardly directed annular stop bead whose rear surface constitutes the front wall of an annular channel designed to receive the edge of a transparent closure panel, said bead being joined to an annular apron which defines the side and rear walls of said annular channel, the apron continuing rearwardly beyond the channel to form a cylindrical finish wall.

16. An instrument case comprising a unitary body portion and a removable back which, when assembled, define a chamber for the reception of movement mechanism, the body portion and back being of material of a thickness of the order of 0.020 inch, the body portion comprising an outer wall of truncated and smoothly conical external contour, said wall comprising an inwardly directed front edge bead consisting of two thicknesses of the material, the rear thickness being integrally joined to an internal, rearwardly directed annular apron, the bead and apron being so relatively arranged and shaped as to define an annular channel to receive the edge of a transparent panel, and means removably uniting the body portion and back member.

17. An instrument case comprising a body portion and back, both of thin, light weight material and which, when assembled, define a chamber for instrument mechanism, the major part of the body portion being of substantially truncated external contour, decreasing in diameter forwardly and having a smooth, thin forward edge, the body portion having an aperture in its peripheral wall for the passage of a pipe-attaching socket, and a relatively stiff bridge member, of heavier material, shaped to constitute the rear plate of a movement frame and which is designed and arranged to support the remainder of such a frame, said bridge member having fastener-receiving apertures designed to receive fasteners by means of which the instrument may be mounted upon a support and by means of which the other parts of the case may be attached to the bridge member, and fasteners uniting the casing parts and bridge member.

18. A case for an instrument of the kind in which movement mechanism is mounted upon a pad forming a part of a socket member which includes a pipe-attaching nipple and which forms a support for one end of a Bourdon tube, said case comprising an annular shell of thin material having integral abutment means at its forward edge for engagement by the front surface of a transparent closure panel, the case also comprising a back of thin material, the shell and back, when assembled, providing a chamber for housing a movement mechanism, a supporting element comprising rigid laterally directed portions, each having an aperture for the reception of a fastener by means of which the instrument may be mounted upon a support, said supporting element having a central portion which constitutes a socket pad, and means removably uniting the shell and back to the laterally directed portions of said supporting element.

19. A case for an instrument of the kind in which movement mechanism is mounted upon a pad forming a part of a socket member which includes a pipe-attaching nipple and which forms a support for one end of a Bourdon tube, said case comprising an annular shell of thin material having integral abutment means at its forward edge for engagement by the front surface of a transparent closure panel, the case also comprising a back of thin material, the shell and back, when assembled, providing a chamber for housing movement mechanism, a supporting element comprising stiff and strong laterally directed portions each having an aperture for the reception of a fastener by means of which the instrument may be mounted upon a support, said supporting element having an integral central portion constituting a socket pad, the shell and back having apertures which register with those in the laterally directed portions of the supporting element, and fasteners passing through said apertures and uniting the shell and back member to said supporting element.

SAMUEL KAHN.